(12) United States Patent
Reinhard et al.

(10) Patent No.: US 10,975,860 B2
(45) Date of Patent: Apr. 13, 2021

(54) DEVICE FOR GENERATING A PULSATING HYDRAULIC FLUID PRESSURE BY A DRIVABLE WORKING PISTON GUIDED IN A CYLINDER AND AN AUXILIARY PISTON GUIDED IN AN AUXILIARY CYLINDER WHEREIN THE AUXILIARY PISTON TRANSFERS FLUID TO AN AUXILIARY CHANNEL ONLY IN A FIRST STROKE SECTION

(71) Applicant: ProMinent GmbH, Heidelberg (DE)

(72) Inventors: Martin Reinhard, Heidelberg (DE); Jorg Maltry, Nussloch (DE)

(73) Assignee: ProMinent GmbH, Heidelberg (DE)

( * ) Notice: Subject to any disclaimer, the term of this patent is extended or adjusted under 35 U.S.C. 154(b) by 30 days.

(21) Appl. No.: 16/097,927

(22) PCT Filed: Aug. 3, 2017

(86) PCT No.: PCT/EP2017/069671
§ 371 (c)(1),
(2) Date: Oct. 31, 2018

(87) PCT Pub. No.: WO2018/029078
PCT Pub. Date: Feb. 15, 2018

(65) Prior Publication Data
US 2019/0203704 A1    Jul. 4, 2019

(30) Foreign Application Priority Data
Aug. 8, 2016   (DE) ............... 10 2016 114 680.3

(51) Int. Cl.
*F04B 5/00*      (2006.01)
*F04B 7/04*      (2006.01)
(Continued)

(52) U.S. Cl.
CPC ............... *F04B 49/06* (2013.01); *F04B 5/00* (2013.01); *F04B 7/04* (2013.01); *F04B 43/06* (2013.01);
(Continued)

(58) Field of Classification Search
CPC .......... F04B 43/02; F04B 49/06; F04B 51/00; F04B 53/10; F04B 5/00; F04B 5/02;
(Continued)

(56) References Cited

U.S. PATENT DOCUMENTS 2,853,015 A  *  9/1958  Pleuger ............... F04B 5/00
                                                           417/389
3,367,270 A  *  2/1968  Schlosser ............ F04B 43/067
                                                           417/388

(Continued)

FOREIGN PATENT DOCUMENTS

DE  10 2006 061462 A1  7/2008
DE  10 2012 207181 A1  10/2013

OTHER PUBLICATIONS

Nora Linder, The International Bureau of the World Intellectual Property Organization, International Preliminary Report on Patentability, PCT/EP2017/069671, dated Feb. 12, 2019 (English translation).

*Primary Examiner* — Patrick Hamo
*Assistant Examiner* — Benjamin Doyle
(74) *Attorney, Agent, or Firm* — Paul & Paul

(57) ABSTRACT

The invention relates to a device for generating a pulsating hydraulic fluid pressure in a working chamber (1) filled with hydraulic fluid, comprising a driveable working piston (4) movably guided in a hollow working cylinder, wherein a working chamber (1) that is in fluid communication with the working piston (4) is provided, such that, by means of the movement of the working piston (4) within the hollow (Continued)

Figure 1A:
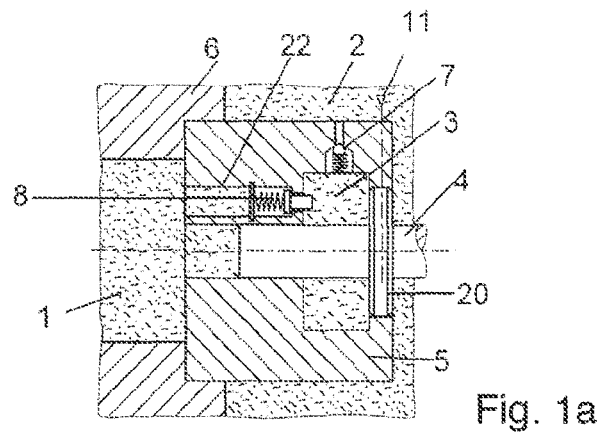

working cylinder, a pulsating hydraulic fluid pressure can be generated in the working chamber (1). In order to provide a device for generating a pulsating hydraulic fluid pressure and in particular a diaphragm metering pump comprising such a device, which has small dimensions and in addition a rapid passage through the phase between closing the suction valve and opening the pressure valve, according to the invention, an auxiliary piston (20) is movably guided in a hollow auxiliary cylinder and is in fluid communication with an additional chamber (18, 21), wherein a closeable auxiliary channel (22), which connects the additional chamber (18, 21) and the working chamber (1), is provided, wherein the auxiliary piston (20) and the hollow auxiliary cylinder are formed and arranged in such a way that, by moving the auxiliary piston (20) within the hollow auxiliary cylinder, a hydraulic fluid arranged in the additional chamber (18, 21) can at least partly be forced out of the additional chamber (18, 21) into the auxiliary channel (22) and from the auxiliary channel (22) into the working chamber (1).

14 Claims, 6 Drawing Sheets

(51) Int. Cl.
*F04B 43/06* (2006.01)
*F04B 43/067* (2006.01)
*F04B 43/02* (2006.01)
*F04B 49/06* (2006.01)
*H04Q 9/00* (2006.01)
*F04B 51/00* (2006.01)
*F04B 53/10* (2006.01)

(52) U.S. Cl.
CPC ............ *F04B 43/067* (2013.01); *F04B 51/00* (2013.01); *H04Q 9/00* (2013.01); *F04B 43/02* (2013.01); *F04B 53/10* (2013.01); *H04Q 2209/60* (2013.01)

(58) Field of Classification Search
CPC .. F04B 43/067; F04B 43/0081; F04B 43/009; F04B 43/06; F04B 9/105; F04B 15/02; F04B 43/073; F04B 43/113; F04B 43/1136; F04B 45/053; F04B 45/0533; F04B 49/24; F04B 53/14; F04B 7/0266; F04B 15/023; F04B 15/06; F04B 17/00; F04B 17/03; F04B 17/05; F04B 1/02; F04B 1/0404; F04B 2201/0201; F04B 2203/0902; F04B 2205/05; F04B 43/0054; F04B 43/0733; F04B 43/0736; F04B 43/084; F04B 43/10; F04B 43/107; F04B 45/02; F04B 45/022; F04B 45/033; F04B 45/0336; F04B 45/043; F04B 45/047; F04B 49/002; F04B 49/22; F04B 49/243; F04B 49/246; F04B 53/02; F04B 53/1007; F04B 53/1017; F04B 53/1087; F04B 43/73; F04B 7/04; H04Q 2209/60; H04Q 9/00; F01L 25/063; F15B 11/22; F15B 11/15; F15B 15/1471; F15B 15/18; F15B 15/204; F15B 15/226; F15B 15/2838; F15B 1/26; F15B 1/265; F15B 2201/3156; F15B 2201/4053; F15B 2211/7054; Y10S 417/90; B60T 8/4022; B60T 8/4036; B60T 8/4059; E21B 33/0355; E21B 34/04; F02M 51/04; F16F 9/465; F25B 15/025
USPC ...................................................... 417/44.1
See application file for complete search history.

(56) References Cited

U.S. PATENT DOCUMENTS

| | | | | |
|---|---|---|---|---|
| 4,383,504 | A * | 5/1983 | Walsworth | F01M 3/00 123/73 AD |
| 4,471,728 | A * | 9/1984 | Borst | F01M 3/02 123/73 AD |
| 4,539,949 | A * | 9/1985 | Walsworth | F04B 9/125 123/73 AD |
| 4,583,500 | A * | 4/1986 | Hundertmark | F01M 3/00 123/196 R |
| 4,624,625 | A * | 11/1986 | Schrenker | F04B 49/20 417/20 |
| 4,690,108 | A * | 9/1987 | Debevec | F02M 59/107 123/73 AD |
| RE32,577 | E * | 1/1988 | DuBois | F01M 3/00 123/198 C |
| 5,047,950 | A * | 9/1991 | Fritsch | G01F 3/20 702/47 |
| 5,197,417 | A * | 3/1993 | Tuckermann | B27B 17/08 123/179.14 |
| 5,647,733 | A * | 7/1997 | Augustyn | F04B 43/009 417/360 |
| 5,735,250 | A * | 4/1998 | Rembold | F02M 51/04 123/504 |
| 6,264,439 | B1 * | 7/2001 | Falk | F04B 17/042 417/417 |
| 7,785,293 | B2 * | 8/2010 | Gray | F04B 53/1032 604/152 |
| 2005/0069425 | A1 * | 3/2005 | Gray | G05D 16/20 417/392 |
| 2008/0273997 | A1 * | 11/2008 | Hembree | F04B 43/073 417/392 |
| 2012/0267327 | A1 * | 10/2012 | Candelora | C02F 1/44 210/808 |

\* cited by examiner

DEVICE FOR GENERATING A PULSATING HYDRAULIC FLUID PRESSURE BY A DRIVABLE WORKING PISTON GUIDED IN A CYLINDER AND AN AUXILIARY PISTON GUIDED IN AN AUXILIARY CYLINDER WHEREIN THE AUXILIARY PISTON TRANSFERS FLUID TO AN AUXILIARY CHANNEL ONLY IN A FIRST STROKE SECTION

CROSS-REFERENCE TO RELATED APPLICATION

This application is a 371 national stage application of International Application PCT/EP2017/069671, filed Aug. 3, 2017, and claims the priority of German Application No. 10 2016 114 680.3, filed on Aug. 8, 2016.

The present invention relates to a device for generating a pulsating hydraulic fluid pressure in a working chamber filled with hydraulic fluid. In particular, the present invention relates to a hydraulically driven diaphragm metering pump with such a device.

Diaphragm metering pumps typically have a dispensing head with a metering chamber, the volume of which can be alternately increased and decreased through the motion of a diaphragm in order to initiate a corresponding pumping process.

The motion of the diaphragm can be effected, for example, by applying a pulsating hydraulic fluid pressure to the side of the diaphragm facing away from the metering chamber. The cavity of the diaphragm metering pump filled with hydraulic fluid pressure is also referred to as working chamber. The diaphragm thus separates the working chamber filled with hydraulic fluid from the metering chamber filled with fluid being pumped.

In order to generate the pulsating hydraulic fluid pressure within the working chamber, a working piston, which is movably guided within a hollow working cylinder, is often driven. Here, the working piston is in fluid communication with the working chamber with the result that, through the movement of the working piston, the volume in the working chamber and thus the hydraulic fluid pressure can be increased and decreased. However, because of the low compressibility of the hydraulic fluid, the change in the volume of the working chamber is small. The increase in the hydraulic fluid pressure does however cause the increased pressure to be transferred via the diaphragm onto the fluid being pumped located in the metering chamber, which in turn leads to a motion of the diaphragm.

In the diaphragm metering pumps described the metering chamber is generally connected via a check valve to a suction line and with a further check valve, the so-called pressure valve, to a pressure line. If the diaphragm is moved in the suction direction, so that the volume of the metering chamber increases, the suction valve opens and fluid being pumped can be sucked via the suction line into the metering chamber. If the motion of the diaphragm is reversed, so that it is moved in the pressure direction, the pressure of the fluid being pumped in the metering chamber increases, with the result that first of all the suction valve closes. The pressure in the metering chamber increases further until the pressure in the metering chamber exceeds the pressure in the pressure line, with the result that the pressure valve opens and fluid being pumped can be pumped out of the metering chamber into the pressure line.

Diaphragm metering pumps pump the fluid being pumped only during the pressure phase, that is while the diaphragm is moving in the pressure direction, and while the pressure valve is opened. In contrast, as long as the diaphragm is moving in the suction direction, such that fluid being pumped is sucked from the suction line into the pumping chamber, and during the pressure increase phase before the pressure valve opens, no fluid is being pumped.

For this reason, it is desirable that those phases of diaphragm motion in which no pumping takes place are passed through as quickly as possible.

It is therefore known to increase the diaphragm speed or the speed of the working piston driving the diaphragm during these phases.

However, limits are placed on the corresponding drive control.

In particular when the diaphragm is moving in the pressure direction, the phase between the closing of the suction valve and the opening of the pressure valve is undesired. In addition to the compressibility of the fluid being pumped and the hydraulic fluid coming into effect above all at high pressures, there are a number of elasticities in the system, not least also caused by the compression of the diaphragm, with the result that the length of time until the desired pressure is formed in the pumping chamber can be considerable.

The problem is exacerbated in the case of high-pressure pumps which are intended to pump small metering quantities as precisely as possible. In order, for example, to pump against a pressure in the pressure line of 400 bar, as a rule a working piston with a small effective working surface area is chosen in order to keep the demands on the piston drive low. Although a working piston with such a small working cross section is well suited to precisely pumping small metering quantities, in certain circumstances it cannot build up the pressure in the pumping space quickly enough, however. In particular, when using very small effective working surface areas of the working piston, the necessary stroke which the working piston must pass through in order to be able to build up the desired pressure in the pumping chamber at all is additionally relatively large, which places further demands on the space requirement and the corresponding drive.

Starting from the described state of the art the object of the present invention is therefore to provide a device for generating a pulsating hydraulic fluid pressure and in particular a diaphragm metering pump with such a device, which has small dimensions and additionally enables the phase between the closing of the suction valve and the opening of the pressure valve, the so-called pressure build-up phase, to be passed through quickly.

This object is achieved according to the invention in that an auxiliary piston is movably guided in a hollow auxiliary cylinder and is in fluid communication with an additional chamber, wherein a closeable auxiliary channel is provided, which connects the additional chamber and the working chamber, wherein the auxiliary piston and hollow auxiliary cylinder are formed and arranged in such a way that, by moving the auxiliary piston within the hollow auxiliary cylinder, hydraulic fluid can at least partly be forced out of the additional chamber into the auxiliary channel and from the auxiliary channel into the working chamber, wherein the auxiliary piston divides the additional chamber into a front and a rear additional chamber section, wherein the auxiliary piston can be moved in such a way that hydraulic fluid can be forced from the front additional chamber section into the auxiliary channel and from the auxiliary channel into the working chamber, and the auxiliary piston and the hollow auxiliary cylinder are formed in such a way that, during the movement, the auxiliary piston passes through a first and a second stroke section, wherein hydraulic fluid can only be transferred from the additional chamber into the auxiliary channel and from the auxiliary channel into the working chamber in the first stroke section.

By providing an auxiliary chamber filled with hydraulic fluid and an auxiliary piston, with which additional hydraulic fluid is brought into the working chamber in particular at the start of the pressure stroke, i.e. during the pressure build-up phase, with the result that the increase in pressure of the hydraulic fluid is caused not only by the movement of the working piston but also by feeding in additional working fluid, the phase can be effectively reduced without pumping.

Here, the two pistons as well as the working and additional chambers are preferably formed in such a way that working fluid is only fed from the auxiliary channel into the working chamber during the pressure build-up phase, i.e. at the start of the pressure movement of the working piston while the valve to the pressure line is still closed.

In a preferred embodiment, the device has a differential piston which comprises both the working piston and the auxiliary piston. The differential piston is movably arranged within a hollow differential cylinder which comprises both the hollow working cylinder and the hollow auxiliary cylinder.

It is thus possible to drive the differential piston with one drive and in the process to move both the working piston in the hollow working cylinder and the auxiliary piston in the hollow auxiliary cylinder.

Although the working and auxiliary pistons can then no longer be moved separately from each other, this is not at all necessary either.

In a further preferred embodiment it is provided that the effective working surface area of the auxiliary piston which is in fluid communication with the auxiliary chamber is larger, preferably more than 100% larger, than the effective working surface area of the working piston which is in fluid communication with the working chamber.

By the effective working surface area is meant the surface area that is in contact with hydraulic fluid and exerts a force on the fluid during a movement of the piston.

In the case of the working piston, as a rule the effective working surface area of the working piston corresponds to the circular end face of the working piston. However, if the device is equipped with a differential piston which comprises both auxiliary piston and working piston, the auxiliary piston is arranged behind the working piston in the axial direction and has a diameter which is larger than the working piston diameter. Since the working piston is fixed to the auxiliary piston, however, the effective working surface area of the auxiliary piston is annular as a rule.

In a further preferred embodiment it is provided that the effective stroke of the auxiliary piston is smaller, preferably more than 50% smaller, than the effective stroke of the working piston.

Here, by the effective stroke is meant the length of the movement of the piston during which the piston exerts force on the fluid being pumped.

This measure takes account of the fact that it is only necessary to support the auxiliary piston during the so-called pressure build-up phase, i.e. during a phase in which no fluid at all is yet being pumped. As soon as enough fluid has been introduced into the working chamber, the actual pumping of the diaphragm metering pump can be effected solely through the movement of the working piston.

According to the invention, the auxiliary piston divides the additional chamber into a front and a rear additional chamber section, wherein the auxiliary piston can be moved in such a way that hydraulic fluid can be forced from the front additional chamber section into the auxiliary channel and from the auxiliary channel into the working chamber, wherein the auxiliary piston and the hollow auxiliary cylinder are formed in such a way that, during the movement, the auxiliary piston passes through a first and a second stroke section, wherein hydraulic fluid can only be transferred from the additional chamber into the auxiliary channel and from the auxiliary channel into the working chamber in the first stroke section. In other words, measures are provided which prevent hydraulic fluid from being transferred by the auxiliary piston in the second stroke section. In this case, the first stroke section is to be regarded as the effective stroke of the auxiliary piston.

Thus it is possible, for example, that, in the second stroke section, the front and the rear additional chamber sections are connected. This could be effected, for example, in that the hollow auxiliary cylinder has a section with a smaller internal diameter which approximately corresponds to the external diameter of the auxiliary piston, and a section with a larger internal diameter. While the auxiliary piston is located in the section with a smaller internal diameter, the auxiliary piston can transfer hydraulic fluid from the additional chamber into the auxiliary channel and from the auxiliary channel into the working chamber. As soon as the auxiliary piston enters the section of the hollow auxiliary cylinder with a larger internal diameter, however, the hydraulic fluid can flow around the auxiliary piston at its circumference, whereby the further transport of hydraulic fluid by the auxiliary piston from the additional chamber into the auxiliary channel and from the auxiliary channel into the working chamber stops.

Alternatively to this, the additional chamber can be connected to the working chamber via a volumetric metering valve in the auxiliary channel, with the result that the hydraulic fluid forced out of the additional chamber by the auxiliary piston actuates the volumetric metering valve, wherein the metered volume of the volumetric valve preferably corresponds to the product of the effective stroke of the auxiliary piston and the effective working surface area of the auxiliary piston.

Volumetric metering valves, sometimes also called dosing valves, are known and are often used for the volumetric delivery of lubricants or fuels. However, in the present case they are used for the delivery of a controlled quantity of hydraulic fluid. Volumetric valves have a metered volume which fills with hydraulic fluid. If the volumetric valve is actuated with the aid of the hydraulic fluid which the auxiliary piston forces out of the additional chamber, exactly the desired metered volume is delivered into the working chamber. Any additional hydraulic fluid which is forced from the auxiliary chamber into the auxiliary channel cannot pass into the working chamber, but is diverted into a corresponding storage tank, for example. This ensures that, with the aid of the auxiliary piston, only a specific quantity of hydraulic fluid is brought into the working chamber, in order to fill the working chamber as quickly as possible. The further movement of the fluid being pumped and the metering connected to it is then brought about exclusively with the aid of the working piston in the known manner.

In a further preferred embodiment it is provided that, between working chamber and additional chamber, a return flow channel is provided in which is arranged a check valve, which allows a fluid flow only in the direction from the additional chamber into the return flow channel and/or from the return flow channel into the working chamber.

This prevents the fluid being pumped, that has been transported into the working chamber, from flowing back into the additional chamber again.

However, at the end of the pressure stroke it is necessary to remove the hydraulic fluid additionally brought into the working chamber from the working chamber again. Therefore, in a preferred embodiment an actuating device is provided for releasing the check valve. The check valve can therefore be released during the suction stroke, for example, in order to achieve a pressure balance between working chamber and additional chamber and thus a targeted return flow of the hydraulic fluid out of the working chamber into the additional chamber.

The actuating device can be actuated by the auxiliary piston, for example. If the actuating device is a mechanical element, such as for example a corresponding lever, the auxiliary piston can actuate the lever in one of its end positions and open the check valve.

In a particularly preferred embodiment, the return flow channel is formed by the auxiliary channel. Alternatively, the return flow channel and auxiliary channel can also be formed separately however. In the latter case, it is then advantageous if the check valve of the return flow channel is spring-loaded, i.e. only opens when the pressure difference between working chamber and auxiliary chamber is so large that the spring force is overcome. Here, the spring force can be chosen so high that the necessary pressure difference is not reached at all in normal operation. The check valve therefore opens only when it is released for example by the auxiliary piston or when the auxiliary channel is blocked for some reason such that the fluid pressure in the auxiliary chamber increases too much.

In a further preferred embodiment, a closeable connecting channel is present between the front additional chamber section and either a hydraulic fluid tank or the rear additional chamber section, wherein the connecting channel is preferably closed by a check valve, which allows a fluid flow only in the direction from the tank or from the rear additional chamber section into the front additional chamber section. Hydraulic fluid can be backfilled into the front additional chamber section via this connecting channel.

In a further preferred embodiment, between working chamber and a hydraulic fluid tank, a discharge channel is provided which has a valve, wherein the valve is preferably a pressure-actuated valve, which is connected to the rear additional chamber section in such a way that the pressure-actuated valve opens when the pressure in the rear additional chamber section rises above a predetermined value.

Further advantages, features and possible applications of the present invention become clear with reference to the following description of different embodiments and the associated figures. There are shown in:

FIGS. 1a to 1e cross-sectional views of a first embodiment in different positions, FIGS. 2a to 2e cross-sectional views of a second embodiment with different working piston positions, FIGS. 3a to 3e cross-sectional views of a third embodiment with different piston positions, FIGS. 4a to 4e sectional views of a fourth embodiment with different piston positions.

FIGS. 1a to 1e show sectional views of a first embodiment of the invention, wherein different positions of the piston are represented in each case.

In this embodiment, the device has a fixed stroke length, i.e. the piston is moved back and forth between two fixed extreme positions.

In FIG. 1a, a pumping unit 6 can be seen with a working chamber 1. In the pumping unit 6, a bushing 5 is introduced in which a piston 4 is movably guided. The piston 4 is driven such that it can move from the extreme right-hand position shown in FIG. 1a to the extreme left-hand position shown in FIG. 1d.

The extreme rear point or dead centre is labelled with the reference number 11, while the extreme front or left-hand point is labelled with the reference number 10. Through the movement of the working piston 4, the piston end face exerts a force on the hydraulic fluid in the working space.

In particular when the device according to the invention is used to drive a diaphragm metering pump, the working space is, however, connected to elastic elements, such as for example the diaphragm, with the result that the pressure in the working space 1 does not build up abruptly, but first of all the elastic elements are compressed. In order to achieve an increase in pressure in the working chamber 1, a not inconsiderable quantity of hydraulic fluid must therefore be transported in the direction of the diaphragm. For this purpose, the working piston 4 is equipped with an auxiliary piston 20, the external diameter of which is considerably larger than the external diameter of the working piston 4. In FIG. 1a, the auxiliary piston 20 delimits an additional chamber 3 in the bushing 5. The additional chamber 3 is connected to the storage tank 2 via a check valve 7. The working piston 4 and auxiliary piston 20 are realized as differential piston 4, 20 in the embodiment shown. In addition, an auxiliary channel 22 is provided, which is equipped with a releasable check valve 8 and connects the additional chamber 3 to the working chamber 1. In the position shown in FIG. 1a, the piston 4 is located in its extreme right-hand position 11. In this position, the auxiliary piston 20 and the bushing 5 border the additional chamber 3. The check valves 7 and 8 are closed. In this situation, the pressure in the working chamber 1 and the tank 2 is approximately equal. The pumping unit 6, the bushing 5 and the piston 4 form the working chamber 1.

If the pressure stroke now starts, the differential piston 4, 20 moves in the direction of the front dead centre position 10. At the start of this movement, both the end-face area of the working piston 4 and the annular working surface area of the auxiliary piston 20 cause an increase in pressure in the hydraulic fluid both in the working chamber and in the additional chamber. Because of the small volume of the additional chamber and lower elasticities in the additional chamber, the increase in pressure in the front additional chamber section 21 is considerably more pronounced than in the working chamber 1, with the result that the check valve 8 opens and hydraulic fluid can flow out of the additional chamber 3 into the working chamber 1.

Figure 1B:
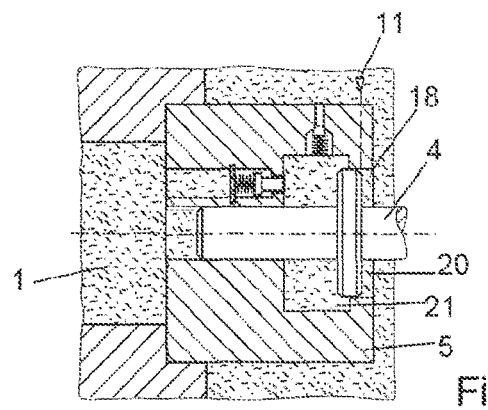

This situation is represented in FIG. 1b.

Figure 1C:
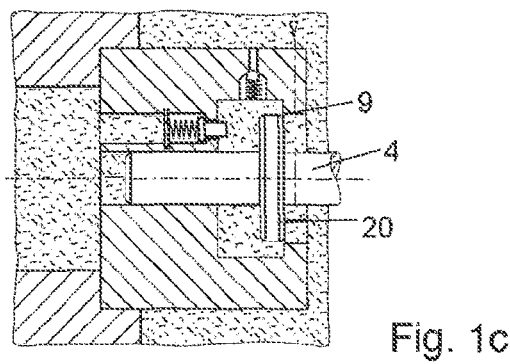

If the differential piston 4 is now moved further in the direction of the extreme left-hand value, the situation represented in FIG. 1c is reached, in which the auxiliary piston 20 no longer borders the additional chamber 3, but a gap 9 forms between the auxiliary piston 20 and the hollow auxiliary cylinder, which surrounds the auxiliary piston.

The front additional chamber section 21 and the rear additional chamber section 18 are thus connected to each other by the gap 9.

Since the auxiliary piston 20 has a working surface area of equal size on both sides, no more pressure can now be built up in the additional chamber 3. Instead the pressure between the front and rear additional chamber sections balances. Since the rear additional chamber section is also connected to the hydraulic fluid tank 2, the pressure in the additional chamber 3 corresponds to the pressure in the tank 2. The check valve 8 then closes and only the working piston 4, i.e. the section with a smaller external diameter, is still active for the rest of the pressure stroke.

Figure 1D:
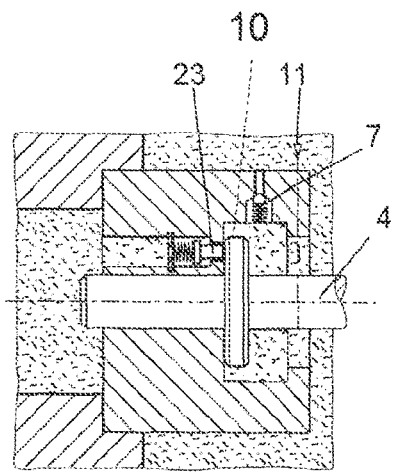

As soon as the auxiliary piston 20 reaches the left-hand dead centre position, it actuates the releasing device 23 of the check valve 8, with the result that excess hydraulic fluid can flow back out of the working chamber into the additional chamber 3. This situation is represented in FIG. 1d.

Since the rear side of the auxiliary piston 20 is connected to the hydraulic fluid tank 2, this therefore results in a pressure balance between working chamber 1 and hydraulic fluid tank 2.

Figure 1E:
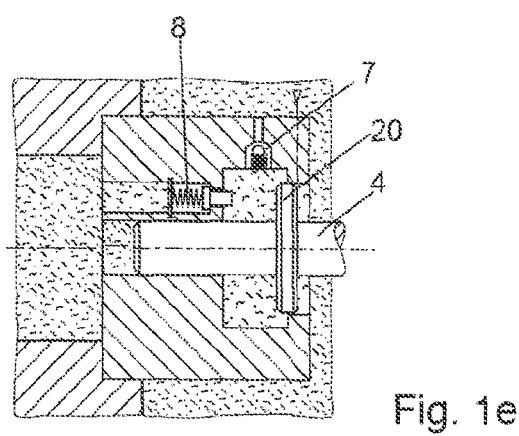

The suction movement of the piston 4 is then effected. As soon as the position shown in FIG. 1e is reached, the pressure in the additional chamber 3 falls, the check valve 8 closes and the check valve 7 opens, with the result that in this position too a pressure balance is effected between hydraulic fluid tank 2 and additional chamber 3. This process is then repeated again starting with the situation which is shown in FIG. 1a.

The embodiment shown requires two fixed extreme positions and thus a fixed stroke length.

However, this is not always desired.

In FIGS. 2a to 2e, an alternative embodiment is therefore shown, in which the stroke length can be adjusted. In the example shown, although the piston has a fixed rear dead centre position, the front dead centre position is not fixed. However, in the embodiment shown in FIGS. 1a to 1e, the front dead centre position was specified, since the piston had to release the corresponding check valve 8.

In FIGS. 2a to 2e, sectional views with different piston positions are also represented. As far as possible, the same reference numbers were used for identical elements.

Figure 2A:
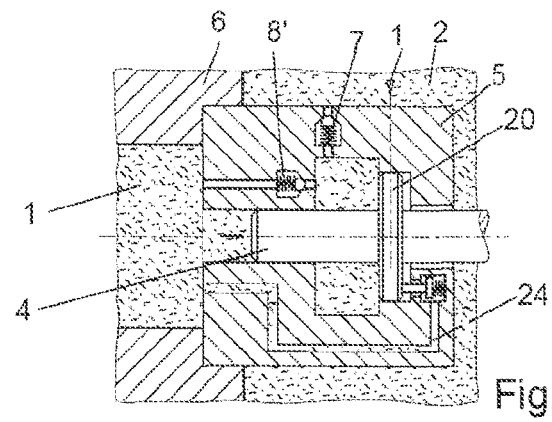
Figure 2B:
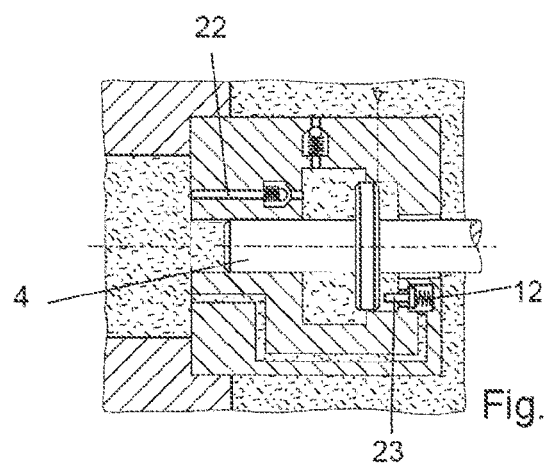

In FIG. 2a, the start of the pressure stroke is represented. The auxiliary piston 20, i.e. the section of the differential piston with a larger external diameter, is located in its rear dead centre position. The additional chamber 3 is bordered by the bushing 5 and the auxiliary piston 20. If the piston is now moved in the pressure direction, i.e. from right to left in the figures, the working piston, i.e. the section of the differential piston 4 with a smaller external diameter, exerts a force on the hydraulic fluid in the working chamber 1, while the auxiliary piston 20 exerts a force on the hydraulic fluid in the additional chamber 3. The pressure in the additional chamber 3 increases more quickly than the pressure in the working chamber 1, with the result that the check valve 8' opens, as is shown in FIG. 2b, and additional hydraulic fluid is forced from the additional chamber 3 into the working chamber 1.

Figure 2C:
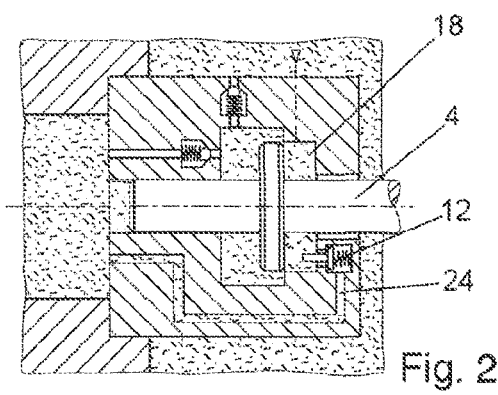

If the differential piston 4 moves further towards the left, the situation shown in FIG. 2c arises, in which the gap 9 opens and a pressure balance is effected between the front additional chamber section 21 and the rear additional chamber section 18, with the result that the pressure in the working chamber 1 is greater than in the additional chamber 3 and the check valve 8' closes. Since the piston does not have a fixed left-hand dead centre position in this embodiment, it cannot be foreseen how far the piston moves towards the left. Therefore, in this embodiment, the check valve 8' also does not have a releasing device since it would not be guaranteed that the auxiliary piston 20 can actually actuate it.

Figure 2D:
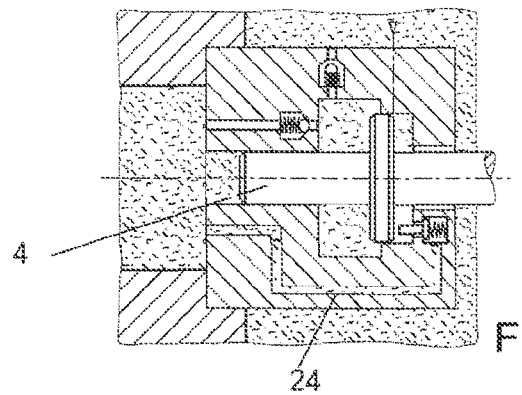

In the suction stroke, the differential piston 4 moves towards the right again without the piston having come close to the check valve 8' and therefore first of all no pressure balance results between the working chamber 1 and the hydraulic fluid tank 2. As soon as the position shown in FIG. 2d is reached, the gap 9 is closed and the pressure in the additional chamber 3 falls, with the result that the check valve 7 opens and a pressure balance takes place between hydraulic fluid tank 2 and additional chamber 3. However, in this situation the hydraulic fluid additionally introduced by the auxiliary piston 20 is still located in the working chamber 1.

Figure 2E:
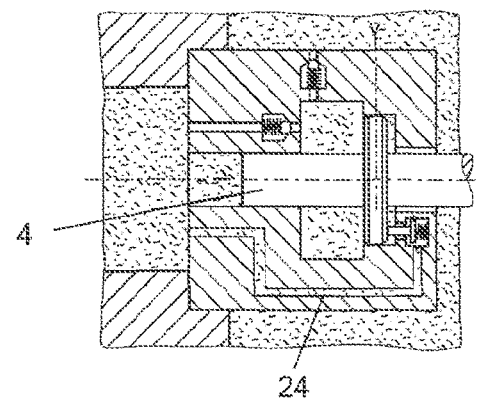

Finally, as is represented in FIG. 2e, the differential piston 4, 20 arrives back at its right-hand dead centre position. In contrast to the embodiment shown in FIGS. 1a to 1e, a further connecting channel is shown here, which connects the working chamber 1 to the rear side of the auxiliary piston 20 and thus to the hydraulic fluid tank 2 via a releasable check valve 12. In the position shown in FIG. 2e, the check valve 12 is released, with the result that, in this situation, the hydraulic fluid additionally introduced by the auxiliary piston 20 can escape from the working chamber 1 into the hydraulic fluid tank 2.

In FIGS. 3a to 3e a further embodiment of the invention is shown, wherein here again the stroke length can be adjusted, but instead of a fixed rear dead centre position there is a fixed front dead centre position.

Again, as far as possible, here too the same reference numbers were used for identical elements.

Figure 3A:
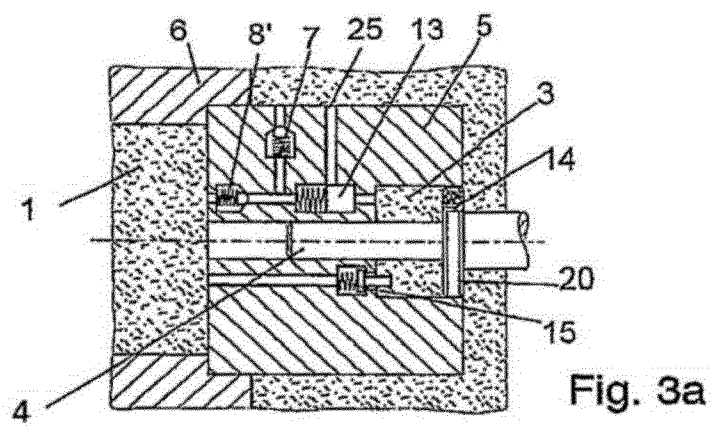

The starting point of the following description is the start of the pressure stroke, as it is represented in FIG. 3a. Here, the displacing piston is located in its rear dead centre position. The differential piston 4, 20 and the bushing 5 border the additional chamber 3. The check valves 7 and 8' are closed. In this embodiment, two further check valves 14, 15 are present. The check valve 14 is arranged within the auxiliary piston 20 and allows a flow of the hydraulic fluid only from the rear additional chamber section 18 into the front additional chamber section 21. The check valve 15 is a releasable check valve which allows the hydraulic fluid to flow from the front additional chamber section 21 into the working chamber 1. The check valve 15 is spring-loaded in such a way that it does not open in normal operation since the pressure difference between additional chamber 3 and working chamber 1 necessary for this is not reached. Therefore, it is only opened in the event of a fault or if it is released by the auxiliary piston 20.

In the position shown in FIG. 3a, the check valves 14 and 15 are also closed. In this embodiment, a volumetric valve 13 is shown in addition which, in the example shown, has a spring-loaded piston.

Figure 3B:
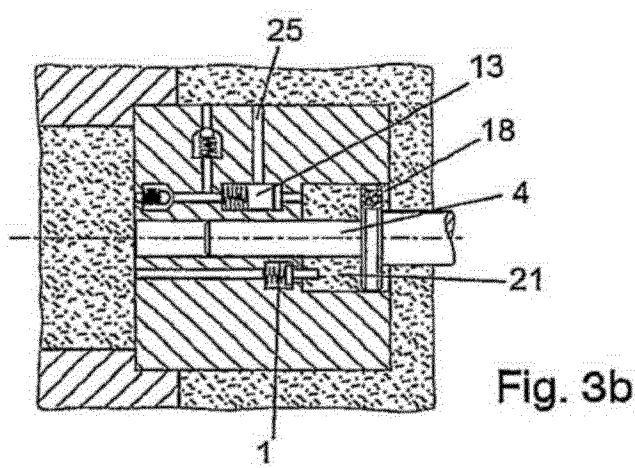

If the differential piston 4, 20 now moves towards the left, the pressure in the working chamber 1 and in the additional chamber 3 increases. Since the additional chamber volume is smaller than the volume of the working chamber, the pressure in the additional chamber 3 increases considerably more quickly than in the working chamber 1. This results in a movement of the piston of the volumetric valve 13, with the result that the pressure of the hydraulic fluid in the channel between the volumetric valve 13 and the two check valves 7 and 8' increases. Therefore, the check valve 8' is also opened and hydraulic fluid is transported out of the channel into the working chamber 1. The hydraulic fluid flowing out of this channel into the working chamber 1 accelerates the build-up of pressure in the working chamber 1. This situation is shown in FIG. 3b.

Figure 3C:
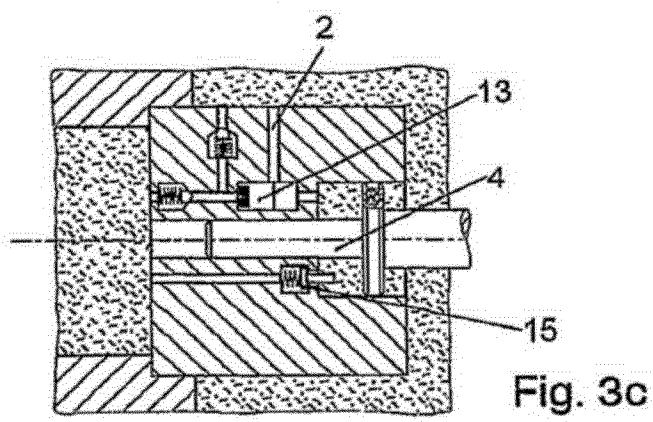

If the differential piston 4 moves further in the direction of its left-hand end point position, at some point the piston of the volumetric valve 13 reaches the position shown in FIG. 3c with the consequence that the pressure in the additional chamber 3 can escape via the discharge channel 25, which connects the volumetric valve 13 to the tank 2. At this moment, a further pumping of hydraulic fluid via the check valve 8' into the working chamber 1 is stopped.

Figure 3D:
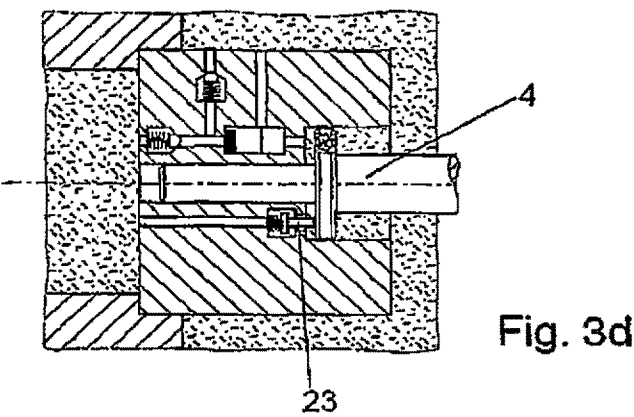
Figure 3E:
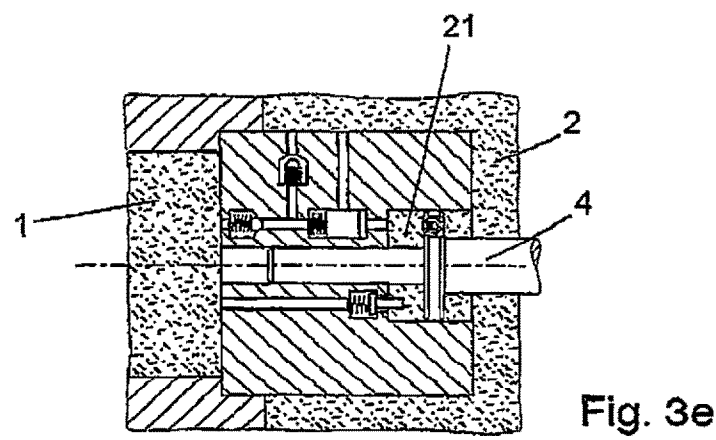
Figure 4A:
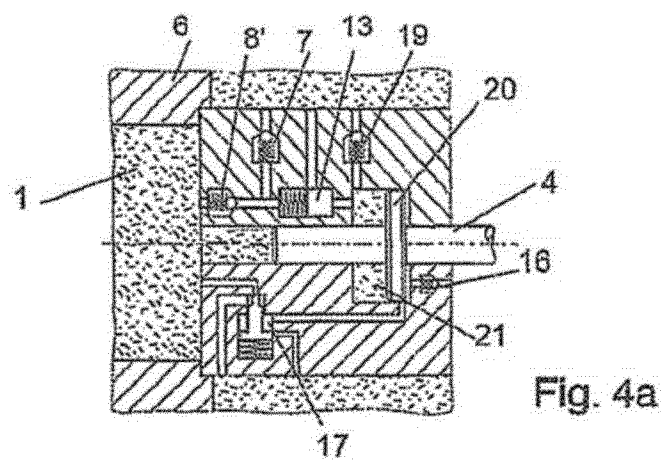
Figure 4B:
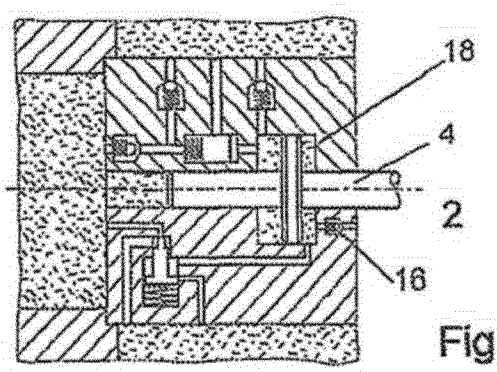
Figure 4C:
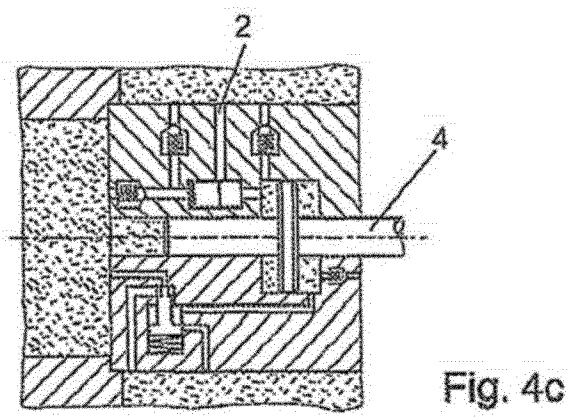
Figure 4D:
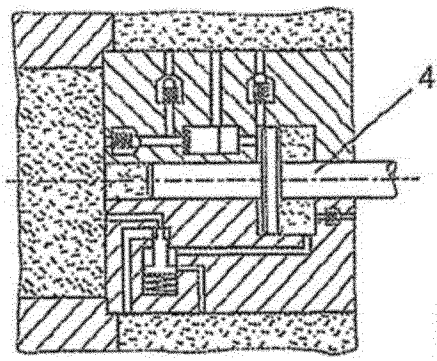
Figure 4E:
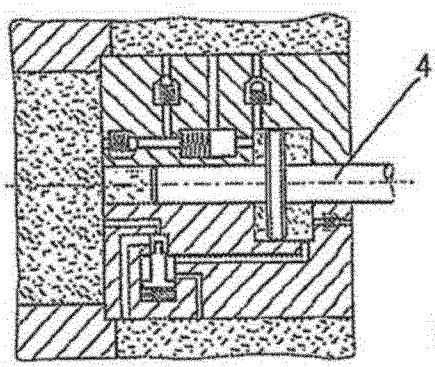

In the case of the further movement of the working piston 4 in the direction of the left-hand dead centre position, only the end face of the working piston 4 is responsible for a further increase in pressure in the working chamber 1, until finally the left-hand dead centre position shown in FIG. 3d is reached. In this position, the auxiliary piston 20 releases the releasable valve 15, whereby the working chamber 1 is connected to the additional chamber 3 and to the storage tank 2 via the volumetric valve 13 and a pressure balance results. In the following suction stroke, the differential piston 4 moves in the direction of its right-hand dead centre position again. The check valve 15 is then closed again and the piston of the volumetric valve 13 moves back into its starting position with the result that the check valve 7 opens and fills the connecting channel between volumetric valve 13, check valve 8' and check valve 7 with hydraulic fluid again. In addition, because of the pressure difference between the rear additional chamber section and the front additional chamber section 21, the check valve 14 is opened, with the result that it is ensured that the pressure balances between the two additional chamber sections.

Figure 4A:
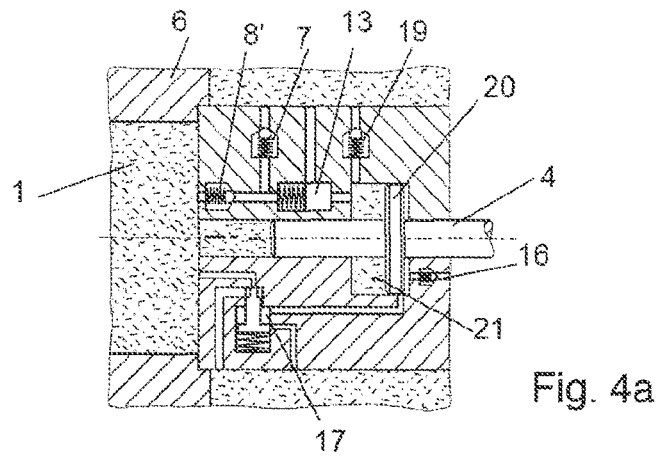

Finally, in FIGS. 4a to 4e a fourth embodiment of the invention is represented, in which the stroke length can be adjusted and there is neither a fixed front nor a fixed rear dead centre position. In this embodiment, the differential piston 4 can be moved as desired. In FIG. 4a, the start of the pressure stroke is represented again. Again, the auxiliary piston 20 and the bushing 5 form the additional chamber 3 or the front additional chamber section, respectively. In this embodiment, the rear additional chamber section 18 is not connected to the hydraulic fluid tank 2. In the position shown in FIG. 4a, the check valves 7 and 8' as well as the two-way valve 17 are closed. The check valve 16, the two-way valve 17 and the volumetric valve 13 are also closed. The pressure in the working chamber 1 and in the tank 2 is the same. The pumping unit 6, the bushing 5 and the differential piston 4 form the working chamber 1.

Figure 4B:
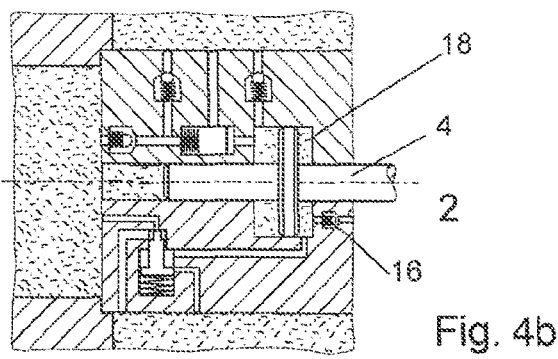

The differential piston 4 now moves in the direction of a front end position, as is represented in FIG. 4b. At the start of the movement, the pressure will increase both in the working chamber 1 and in the front additional chamber section 21. Because of the smaller volume in the additional chamber, the pressure in the additional chamber 3 increases considerably more quickly than in the working chamber 1. The result of this is that the piston of the volumetric valve 13 moves in the direction of the working space 1, with the result that the check valve 8' opens. Hydraulic fluid is thereby pumped via the check valve 8' into the working chamber 1, which results in an additional increase in pressure in the working chamber 1. In this position, the pressure in the rear additional chamber section 18 falls, because of the check valve 16 which connects the rear additional chamber section 18 to the tank 2, however, a pressure balance and thus backfilling of hydraulic fluid in the rear additional chamber section 18 results.

The piston then moves further in the direction of its front end position with the result that the piston of the volumetric valve 13 reaches its left-hand end position and opens the discharge bore to the tank 2. In the front additional chamber section, no more pressure is built up as a result of this. However, the further build-up of pressure because of the working piston results in the pressure in the working chamber 1 increasing further. The check valve 8 therefore closes.

Figure 4C:
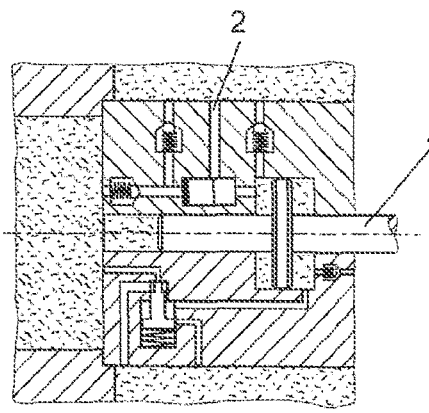
Figure 4D:
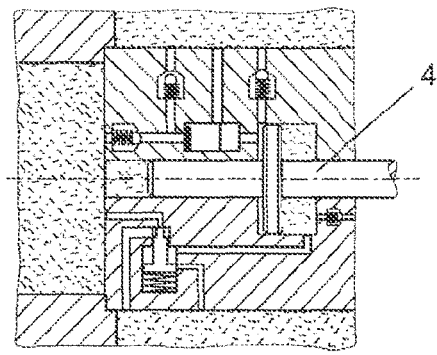
Figure 4E:
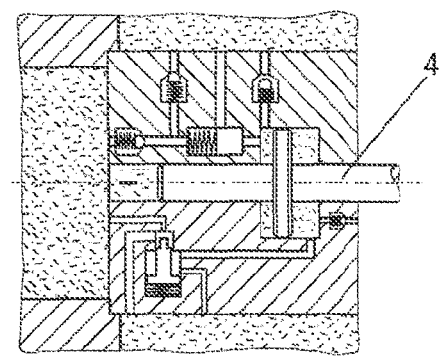
Figure 1A:
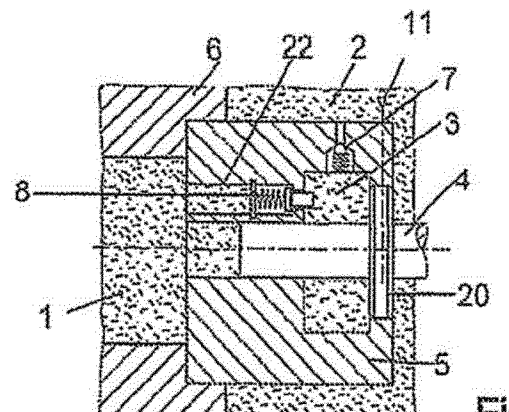
Figure 1B:
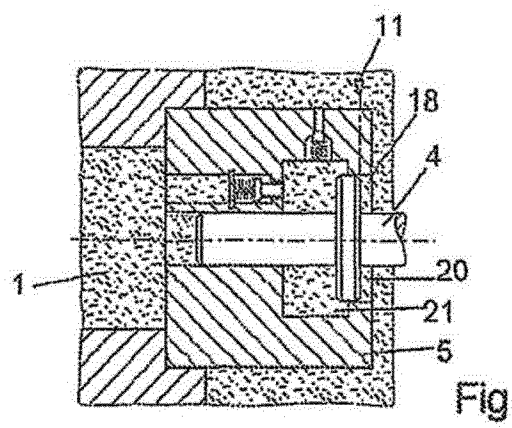
Figure 1C:
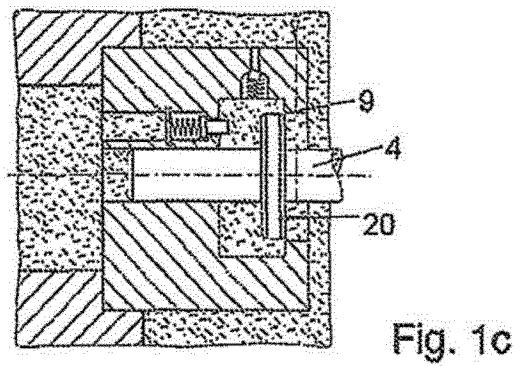
Figure 1D:
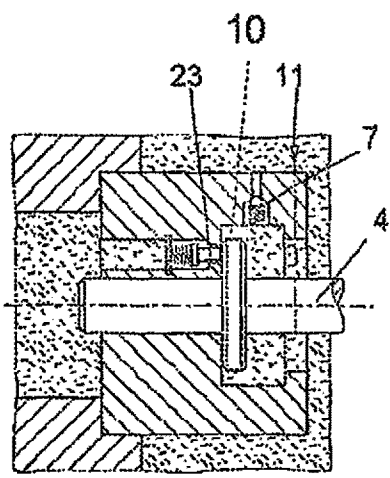
Figure 1E:
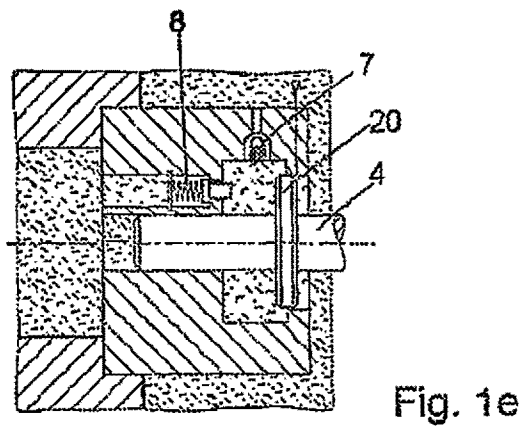
Figure 2A:
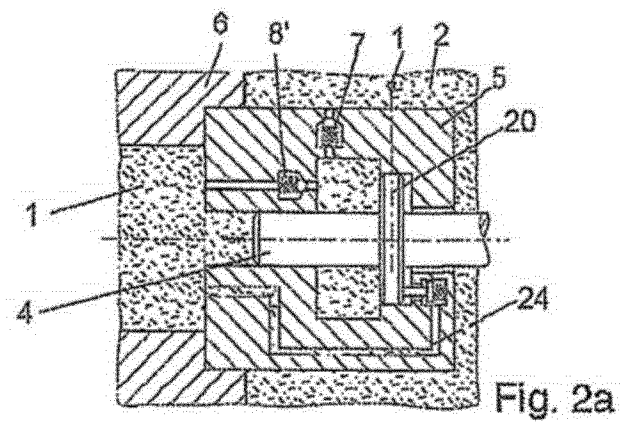
Figure 2B:
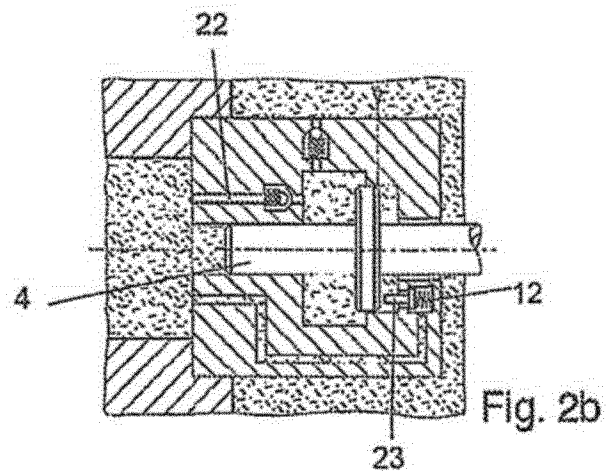
Figure 2C:
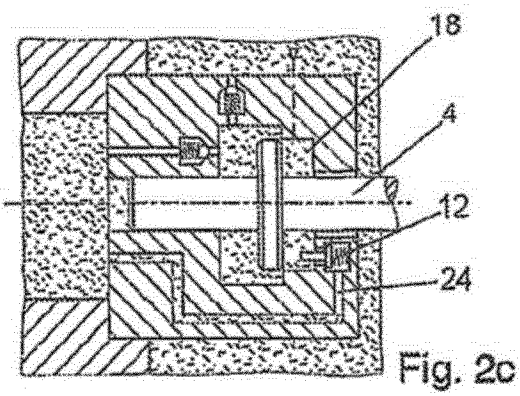
Figure 2D:
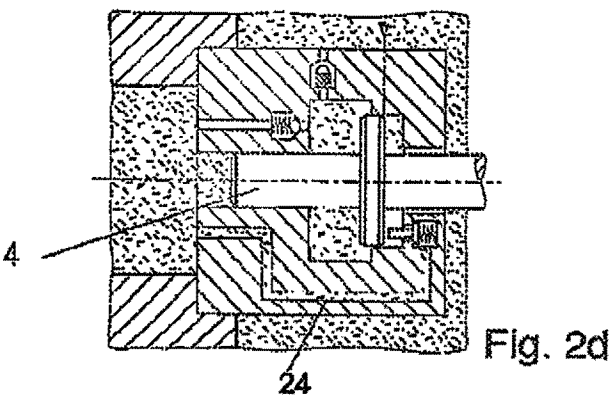
Figure 2E:
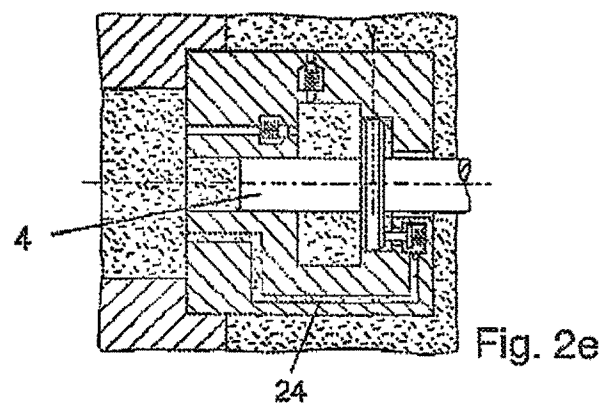

This situation is shown in FIG. 4c.

At the start of the suction stroke, the piston of the volumetric valve 13 moves towards the right back in the direction of the additional chamber 3. Due to the increase in volume between the two check valves 7 and 8' and the piston of the volumetric valve, a negative pressure forms, with the result that the check valve 7 opens and oil flows out of the tank 2 via the check valve 7 into the bores. In addition, the pressure in the rear auxiliary chamber section 18 increases. This, in turn, results in the two-way valve 17 opening, with the result that a connection between the working chamber 1 and the storage tank 2 is opened up via a corresponding discharge channel. The hydraulic fluid additionally introduced into the working chamber 1 by the auxiliary piston 20 or by the volumetric valve 13 can thus escape into the tank 2.

The check valves 7, 8' are closed and the piston of the volumetric valve 13 is located in the right-hand end position, with the result that the negative pressure in the additional chamber 3 opens the check valve 19 and hydraulic fluid can flow from the tank 2 via the check valve 19 into the additional chamber 3.

REFERENCE NUMBERS

1 Working chamber
2 Hydraulic fluid tank
3 Additional chamber
4 Working piston
5 Bushing
6 Pumping unit
7 Check valve
8 Check valve
8' Check valve
9 Gap
10 Dead centre position
11 Dead centre position
12 Check valve
13 Volumetric valve
14 Check valve
15 Releasable check valve
16 Check valve
17 Two-way valve
18 Rear additional chamber section
19 Check valve
20 Auxiliary piston
21 Front additional chamber section
22 Auxiliary channel
23 Releasing device
24 Connecting channel
25 Discharge channel

The invention claimed is:

1. Device for generating a pulsating hydraulic fluid pressure in a working chamber filled with hydraulic fluid with a drivable working piston movably guided in a hollow working cylinder, wherein the working chamber that is in fluid communication with the working piston is provided such that, by means of a movement of the working piston within the hollow working cylinder, the pulsating hydraulic fluid pressure can be generated in the working chamber, wherein an auxiliary piston is movably guided in a hollow auxiliary cylinder and is in fluid communication with an additional chamber, wherein a closeable auxiliary channel is provided, which connects the additional chamber and the working chamber, wherein the auxiliary piston and hollow auxiliary cylinder are formed and arranged in such a way that, by moving the auxiliary piston within the hollow auxiliary cylinder, hydraulic fluid arranged in the additional chamber can at least partly be forced out of the additional chamber into the auxiliary channel and from the auxiliary channel into the working chamber, wherein the auxiliary piston divides the additional chamber into a front and a rear additional chamber section, wherein the auxiliary piston can be moved in such a way that hydraulic fluid can be forced from the front additional chamber section into the auxiliary channel and from the auxiliary channel into the working chamber, and the auxiliary piston and the hollow auxiliary cylinder are formed in such a way that, during the movement, the auxiliary piston passes through a first and a second stroke section, wherein hydraulic fluid can only be transferred from the additional chamber into the auxiliary channel and from the auxiliary channel into the working chamber in the first stroke section.

2. Device according to claim 1, characterized in that a differential piston is provided which comprises both the working piston and the auxiliary piston, wherein the differential piston is movably arranged within a hollow differential cylinder which comprises both the hollow working cylinder and the hollow auxiliary cylinder.

3. Device according to claim 1, characterized in that the effective working surface area of the auxiliary piston which is in fluid communication with the auxiliary chamber is larger, preferably more than 100% larger, than the effective working surface area of the working piston which is in fluid communication with the working chamber.

4. Device according to claim 1, characterized in that the effective stroke of the auxiliary piston is smaller, preferably more than 50% smaller, than the effective stroke of the working piston.

5. Device according to claim 1, characterized in that, in the second stroke section, the front and the rear additional chamber sections are connected.

6. Device according to claim 1, characterized in that the additional chamber is connected to the working chamber via a volumetric metering valve in the auxiliary channel, with the result that the hydraulic fluid forced out of the additional chamber by the auxiliary piston actuates the volumetric metering valve, wherein the metered volume of the volumetric valve preferably corresponds to the product of the effective stroke of the auxiliary piston and the effective working surface area of the auxiliary piston.

7. Device according to claim 1, characterized in that, between working the chamber and the additional chamber, a return flow channel is provided in which is arranged a check valve, which allows a fluid flow only in the direction from the additional chamber into the return flow channel and/or from the return flow channel into the working chamber.

8. Device according to claim 7, characterized in that an actuating device is provided for releasing the check valve which can be actuated by the auxiliary piston, wherein the return flow channel is preferably formed by the auxiliary channel.

9. Device according to claim 1, characterized in that a closeable connecting channel is present between the front additional chamber section and a hydraulic fluid tank, which allows a fluid flow only in the direction from the tank or from the rear additional chamber section into the front additional chamber section.

10. Device according to claim 1, characterized in that, between the working chamber and a hydraulic fluid tank, a discharge channel is provided which has a pressure-actuated valve which is connected to the rear additional chamber section in such a way that the pressure-actuated valve opens when the pressure in the rear additional chamber section rises above a predetermined value.

11. Diaphragm pump with a cavity and a diaphragm, which divides the cavity into a diaphragm working chamber and a metering chamber, characterized in that a device according to claim 10 provided provides the pulsating hydraulic fluid pressure to the diaphragm working chamber.

12. Device according to claim 9, characterized in that a closeable connecting channel is present between the front additional chamber section and the rear additional chamber section, which allows a fluid flow only in the direction from the tank or from the rear additional chamber section into the front additional chamber section.

13. Device according to claim 9, wherein the connecting channel is closed by a check valve.

14. Device according to claim 12, wherein the connecting channel is closed by a check valve.

* * * * *

UNITED STATES PATENT AND TRADEMARK OFFICE
CERTIFICATE OF CORRECTION

PATENT NO. : 10,975,860 B2  Page 1 of 11
APPLICATION NO. : 16/097927
DATED : April 13, 2021
INVENTOR(S) : Reinhard et al.

It is certified that error appears in the above-identified patent and that said Letters Patent is hereby corrected as shown below:

On the Title Page

Delete the Title Page and substitute therefore with the attached Title Page consisting of the corrected illustrative figures In the Drawings Please replace FIGS. 1A-4E with FIGS. 1A-4E as shown on the attached pages In the Claims Column 10, Line 67, before "hydraulic" insert -- the --

Column 12, Line 4, before "working" insert -- the --

Column 12, Line 29, change "claim 10 provided provides" to -- claim 1 provides --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

(12) United States Patent (10) Patent No.: US 10,975,860 B2
Reinhard et al. (45) Date of Patent: Apr. 13, 2021

(54) DEVICE FOR GENERATING A PULSATING HYDRAULIC FLUID PRESSURE BY A DRIVABLE WORKING PISTON GUIDED IN A CYLINDER AND AN AUXILIARY PISTON GUIDED IN AN AUXILIARY CYLINDER WHEREIN THE AUXILIARY PISTON TRANSFERS FLUID TO AN AUXILIARY CHANNEL ONLY IN A FIRST STROKE SECTION

(71) Applicant: ProMinent GmbH, Heidelberg (DE)

(72) Inventors: Martin Reinhard, Heidelberg (DE); Jorg Maltry, Nussloch (DE)

(73) Assignee: ProMinent GmbH, Heidelberg (DE)

( * ) Notice: Subject to any disclaimer, the term of this patent is extended or adjusted under 35 U.S.C. 154(b) by 30 days.

(21) Appl. No.: 16/097,927

(22) PCT Filed: Aug. 3, 2017

(86) PCT No.: PCT/EP2017/069671
§ 371 (c)(1),
(2) Date: Oct. 31, 2018

(87) PCT Pub. No.: WO2018/029078
PCT Pub. Date: Feb. 15, 2018

(65) Prior Publication Data
US 2019/0203704 A1    Jul. 4, 2019

(30) Foreign Application Priority Data
Aug. 8, 2016    (DE) .................. 10 2016 114 680.3

(51) Int. Cl.
*F04B 5/00* (2006.01)
*F04B 7/04* (2006.01)
(Continued)

(52) U.S. Cl.
CPC ............ *F04B 49/06* (2013.01); *F04B 5/00* (2013.01); *F04B 7/04* (2013.01); *F04B 43/06* (2013.01);
(Continued)

(58) Field of Classification Search
CPC .......... F04B 43/02; F04B 49/06; F04B 51/00; F04B 53/10; F04B 5/00; F04B 5/02;
(Continued)

(56) References Cited

U.S. PATENT DOCUMENTS 2,853,015 A * 9/1958 Pleuger ............... F04B 5/00
417/389
3,367,270 A * 2/1968 Schlosser ........... F04B 43/067
417/388
(Continued)

FOREIGN PATENT DOCUMENTS

DE    10 2006 061462 A1    7/2008
DE    10 2012 207181 A1    10/2013

OTHER PUBLICATIONS

Nora Linder, The International Bureau of the World Intellectual Property Organization, International Preliminary Report on Patentability, PCT/EP2017/069671, dated Feb. 12, 2019 (English translation).

*Primary Examiner* — Patrick Hamo
*Assistant Examiner* — Benjamin Doyle
(74) *Attorney, Agent, or Firm* — Paul & Paul

(57) ABSTRACT

The invention relates to a device for generating a pulsating hydraulic fluid pressure in a working chamber (1) filled with hydraulic fluid, comprising a driveable working piston (4) movably guided in a hollow working cylinder, wherein a working chamber (1) that is in fluid communication with the working piston (4) is provided, such that, by means of the movement of the working piston (4) within the hollow
(Continued)

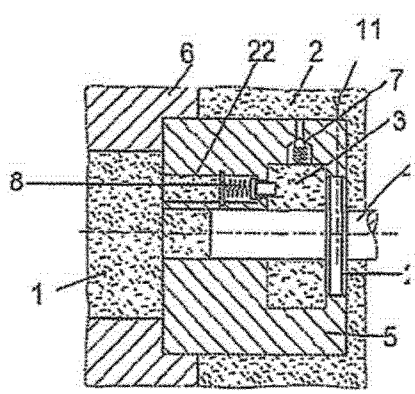
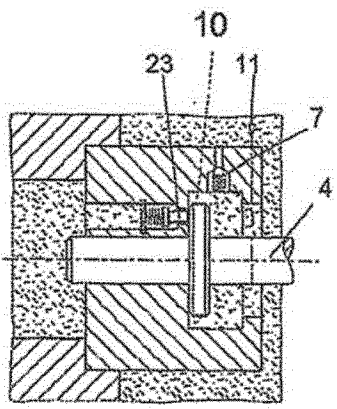

working cylinder, a pulsating hydraulic fluid pressure can be generated in the working chamber (1). In order to provide a device for generating a pulsating hydraulic fluid pressure and in particular a diaphragm metering pump comprising such a device, which has small dimensions and in addition a rapid passage through the phase between closing the suction valve and opening the pressure valve, according to the invention, an auxiliary piston (20) is movably guided in a hollow auxiliary cylinder and is in fluid communication with an additional chamber (18, 21), wherein a closeable auxiliary channel (22), which connects the additional chamber (18, 21) and the working chamber (1), is provided, wherein the auxiliary piston (20) and the hollow auxiliary cylinder are formed and arranged in such a way that, by moving the auxiliary piston (20) within the hollow auxiliary cylinder, a hydraulic fluid arranged in the additional chamber (18, 21) can at least partly be forced out of the additional chamber (18, 21) into the auxiliary channel (22) and from the auxiliary channel (22) into the working chamber (1).

14 Claims, 8 Drawing Sheets

(51) Int. Cl.
   *F04B 43/06* (2006.01)
   *F04B 43/067* (2006.01)
   *F04B 43/02* (2006.01)
   *F04B 49/06* (2006.01)
   *H04Q 9/00* (2006.01)
   *F04B 51/00* (2006.01)
   *F04B 53/10* (2006.01)

(52) U.S. Cl.
   CPC ............ *F04B 43/067* (2013.01); *F04B 51/00* (2013.01); *H04Q 9/00* (2013.01); *F04B 43/02* (2013.01); *F04B 53/10* (2013.01); *H04Q 2209/60* (2013.01)

(58) Field of Classification Search
   CPC .. F04B 43/067; F04B 43/0081; F04B 43/009; F04B 43/06; F04B 9/105; F04B 15/02; F04B 43/073; F04B 43/113; F04B 43/1136; F04B 45/053; F04B 45/0533; F04B 49/24; F04B 53/14; F04B 7/0266; F04B 15/023; F04B 15/06; F04B 17/00; F04B 17/03; F04B 17/05; F04B 1/02; F04B 1/0404; F04B 2201/0201; F04B 2203/0902; F04B 2205/05; F04B 43/0054; F04B 43/0733; F04B 43/0736; F04B 43/084; F04B 43/10; F04B 43/107; F04B 45/02; F04B 45/022; F04B 45/033; F04B 45/0336; F04B 45/043; F04B 45/047; F04B 49/002; F04B 49/22; F04B 49/243; F04B 49/246; F04B 53/02; F04B 53/1007; F04B 53/1017; F04B 53/1087; F04B 43/73; F04B 7/04; H04Q 2209/60; H04Q 9/00; F01L 25/063; F15B 11/22; F15B 11/15; F15B 15/1471; F15B 15/18; F15B 15/204; F15B 15/226; F15B 15/2838; F15B 1/26; F15B 1/265; F15B 2201/3156; F15B 2201/4053; F15B 2211/7054; Y10S 417/90; B60T 8/4022; B60T 8/4036; B60T 8/4059; E21B 33/0355; E21B 34/04; F02M 51/04; F16F 9/465; F25B 15/025
   USPC .................................................. 417/44.1
   See application file for complete search history.

(56) References Cited

U.S. PATENT DOCUMENTS

| | | | | |
|---|---|---|---|---|
| 4,383,504 | A * | 5/1983 | Walsworth | F01M 3/00 123/73 AD |
| 4,471,728 | A * | 9/1984 | Borst | F01M 3/02 123/73 AD |
| 4,539,949 | A * | 9/1985 | Walsworth | F04B 9/125 123/73 AD |
| 4,583,500 | A * | 4/1986 | Hundertmark | F01M 3/00 123/196 R |
| 4,624,625 | A * | 11/1986 | Schrenker | F04B 49/20 417/20 |
| 4,690,108 | A * | 9/1987 | Debevec | F02M 59/107 123/73 AD |
| RE32,577 | E * | 1/1988 | DuBois | F01M 3/00 123/198 C |
| 5,047,950 | A * | 9/1991 | Fritsch | G01F 3/20 702/47 |
| 5,197,417 | A * | 3/1993 | Tuckermann | B27B 17/08 123/179.14 |
| 5,647,733 | A * | 7/1997 | Augustyn | F04B 43/009 417/360 |
| 5,735,250 | A * | 4/1998 | Rembold | F02M 51/04 123/504 |
| 6,264,439 | B1 * | 7/2001 | Falk | F04B 17/042 417/417 |
| 7,785,293 | B2 * | 8/2010 | Gray | F04B 53/1032 604/152 |
| 2005/0069425 | A1 * | 3/2005 | Gray | G05D 16/20 417/392 |
| 2008/0273997 | A1 * | 11/2008 | Hembree | F04B 43/073 417/392 |
| 2012/0267327 | A1 * | 10/2012 | Candelora | C02F 1/44 210/808 |

* cited by examiner